Aug. 31, 1943.  E. REANEY  2,328,494

MILLING CUTTER

Filed May 7, 1942

INVENTOR
Ernest Reaney
Albert F. Nathan
ATTORNEY

Patented Aug. 31, 1943

2,328,494

UNITED STATES PATENT OFFICE 2,328,494

MILLING CUTTER

Ernest Reaney, Stratford, Conn., assignor to The O. K. Tool Company, Inc., New York, N. Y., a corporation of New York Application May 7, 1942, Serial No. 442,059

10 Claims. (Cl. 29—105)

This invention relates to improvements in milling cutters and has for its primary objective to render available a cutter capable of milling steel surfaces and to produce thereon a mirror-like finish.

A further aim of the invention is to provide a cutter that may be driven, when working on steel, at a relatively high rate of speed, which will not run hot, and a cutter which is self-cleaning in the sense that it neither becomes jammed with chips nor shows any tendency to develop the so-called build-up edge.

Still another aim of this invention is to render available a cutter that may have its cutting edges tipped with a carbide alloy or other cemented alloy to thereby further increase the machining rate on steel.

Prior to this invention, the milling of steel has not been satisfactorily accomplished with carbide tipped cutters. Carbide tipped milling cutters, when applied to steel, were found soon to flake or chip along their cutting edges and the cutter became ruined in a very short while. For some time, manufacturers have been endeavoring to mill steel with carbide tipped cutters, but up until now, have not achieved success because of the cracking of the cemented carbide, and they have been forced to continue with the infinitely slower method of planing, grinding, and milling, using cutters having blades made of high speed steel.

In my copending application Serial No. 440,497, filed April 25, 1942, there is disclosed an improved method of machining steel with a rotary tool and the present invention has to do with the structure of a preferred form of cutter useful in the carrying forward of that method.

With a high speed steel cutter of conventional design, 6 inches in diameter, and having 12 blades, the best that is to be expected therefrom on steel is a feed of 2½ inches per minute, at 40 R. P. M. cutter speed, for a reasonable depth of cut. This is an extremely slow operation for today's needs, and in comparison with my improved cutter and method herein explained, is less than half the amount that may be accomplished with the same size cutter with blades tipped with carbide of tungsten or tantalum. In accordance with the present invention, a carbide tipped cutter is used and driven at 247 R. P. M., with a work feed of 5⅛ inches per minute for the same depth of cut, on steel. This increase in machining rate is not alone due to the carbide tipped blades but also to a certain angular relationship of the blade to the work, that I have discovered to be of special importance when working on steel.

This new angular relationship that yields such surprising results on even the toughest grades of steel may be best understood by placing a carbide tipped blade edgewise to the surface and diagonally thereacross, then leaning the blade forward slightly over the surface and moving it forward in such manner that the outer end or corner of the blade trails or is behind the leading end, i. e., the blade is inclined in two directions with respect to the plane of the surface and line of its travel over that surface. In a tool of this invention the slant and lateral incline of the cutting blade is precisely counter to the incline and lateral incline of a blade of a conventional cutter or other instrument whose point leads and gets under the layer to be removed.

Also, with a cutting tool constructed in accordance with this invention, the layer of stock to be removed is shorn from its mass with a combination shear and draw type of cut accompanied by a downward pressure upon the work. With the conventional style of cutter, the layer is lifted and torn from the mass. And it is the latter type of action, i. e., where the point leads and gets under the layer, that has been universally accepted as the way machining of metal must be accomplished. For a large range or field of work, the conventional method is highly satisfactory, but it is quite unsatisfactory in respect to milling steel because of cutter break down especially if the cutter is tipped with a cemented carbide.

In endeavoring to overcome the problem of flaking or cracking of the carbide tipped blades heretofore experienced, this invention proposes to adapt the forward leaning principle above explained, to a rotary milling cutter equipped with blades tipped with carbide. Starting with a cylindrical base or body, a series of blade slots are cut in its periphery, each slot being at an angle to the axis and extending somewhat helically longitudinally thereof. In addition to giving the slot a helix angle relative to the axis, the general plane of each of the slots is inclined forward so that an extension of that plane intersects a diametral plane of the body at a point considerably ahead of the axis of rotation. As viewed from the end face of the cutter body, and assuming the completed cutter is to turn counterclockwise (as viewed from the face end), the extended radial plane of the front face of the lowest blade therein extends well to the right of the center thereof, and the axial plane proceeds from the end face helically around the body in a direction counter or opposite to the hand of the cutter. The blade slots may be tapered and blades driven thereinto either from the end or radially to lock them in position.

With a cutter so constituted, any given blade, at the time it engages the work, will first engage the work at a point on its peripheral edge some distance axially removed from the outer or face end thereof due to the counterclockwise helix angle of the blade. An axial projection of this point of initial contact toward the face end of the blade (outer corner) places the point of initial contact some distance ahead of that corner. Or conversely, the advancing helix positions the outer corner of the blade rotationally behind the other portions of the peripheral cutting edge so that this outer corner engages the work surface last with relation to the other peripheral edge portions of the blade.

With a similar effect is the cutting action that occurs along the radial cutting edge of the blade. With respect to the face end, the cutting edges slants forward ahead of the axis so that the corner of the workpiece first engages the edge at a point radially inwards from the peripheral end and as the cutter rotates the contact shifts outwards along the edge until the point is reached. Here also, the outer end of the cutting edge trails more inwardly located portions and again the chip engaging face of the blade leans forward and overlies the chip.

I have found that a six inch, twelve toothed cutter, each tooth tipped with carbide, performs remarkably well on steel when the chip engaging face of each tooth or blade leans forward over the chip approximately 10° from the perpendicular and the cutting starts at a point some distance axially inward from the end of the blade and progresses outwardly toward the point, i. e., from heel-toward-the-toe.

By so overlaying the work with the blade and having the cut progress along the edge from a midpoint on the periphery (in the case of peripheral cutting) and from a point radially inward (in the case of end milling or face milling), the initial impact or shock on the blade is taken by a well supported midsection of ample size and proportion. From that point the cutting stress progresses outwardly, at a more or less constant value, toward the outer corner of the blade. That outer corner does not, therefore, have to withstand repeated hammer-like blows each time the blade enters the work. The results on steel with this type of milling cutter has been found to exceed all expectations.

Furthermore, with such a leaning-over of the blade, one would expect that the surface layer of the steel to be removed would be crushed and pushed along until a relatively large mass accumulated in front of the blade. This, however, is not the case with the present cutter because the cut starts back from the point and progresses diagonally across the work. The rearward portion of the blade that enters the work first, starts leaving the work before the next outward zone leaves, and so on out to the extreme end of the blade. Thus, a chip of fairly narrow proportions starts midway of the blade and curls outwardly along the blade until the end thereof. And this channel or path of the cut (in the case of peripheral cutting) extends diagonally across the work due to the feed of the work relative to the cutter axis. Consequently, the width of the chip that comes off is considerably smaller than what it would be if the lead angle of the blade was zero or opposite to that explained.

While the cutting action performed along the periphery of and by any one blade, progresses laterally across the work, the cutter as a whole rotates in a plane perpendicular to its axis and the forwardly leaning and helically inclined blades are also moving bodily in that circular path. The direction of rotation of the cutter may be either way with respect to the direction of feed but it is preferred to rotate the cutter against the feed (cutting up) so that as each point or unit area longitudinally along the peripheral edge of the cutter successively engages the workpiece, they are disposed at an angle such that the cutting action results in a transverse direction and becomes a combination shear and draw.

When using the cutter as a face mill, the outer end of each cutting edge is trailing zones more inwardly located, due to the forward slant of the blades. Again, the chip engaging face leans forward over the chip and the cutting pressure is somewhat downward and radially outward, the chip starting at a region in from the periphery and moving out to the periphery where it is thrown off as the cutter revolves. In both instances, face and peripheral cutting, the chips are moved outwards along the cutting edges away from the cutter body and a continual wiping of the front face of the blades takes place which prevents clogging and the formation of a built-up edge.

Moreover, it has been found under actual working conditions that a carbide tipped cutter constructed as explained herein, notwithstanding that it was driven at a rate of approximately 250 R. P. M. and taking repeated cuts on steel, the cutter itself remained cool to the touch while the chips removed and thrown out thereby were red hot.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which—

Figure 1:
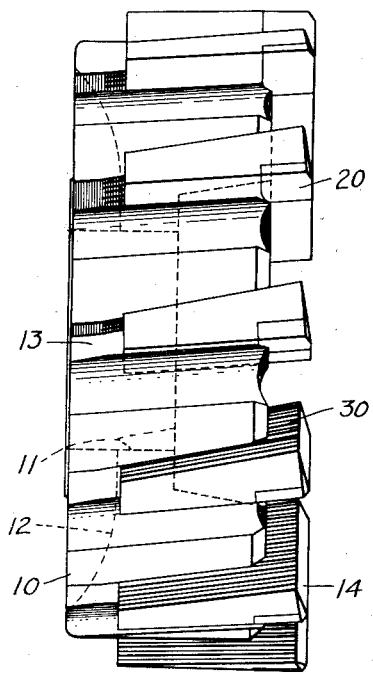
Figure 1 is a side view of a milling cutter embodying the principle of this invention.
Figure 2:
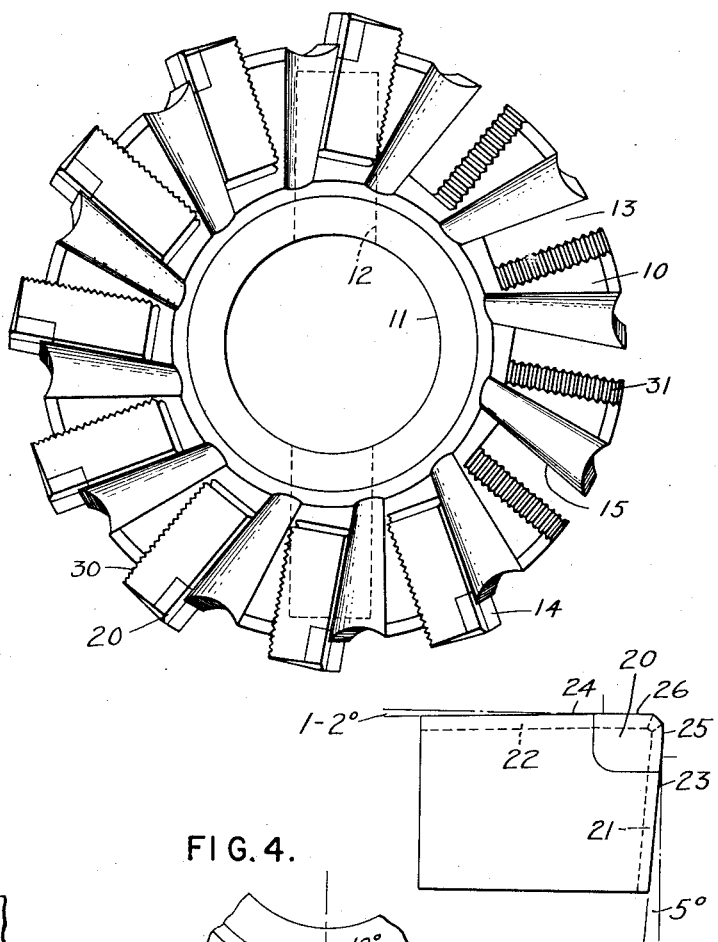
Fig. 2 is an end face view of the cutter illustrated in Figure 1.

With reference to Figs. 1 and 2, the milling cutter represented, is what may be regarded as a right hand face mill, i. e., when its end face is placed against the workpiece it turns clockwise (right handed) as viewed from its shank end. As it is rotating, the workpiece is fed laterally across the end face thereof. The cutter comprises a main body member 10 which is bored and recessed at 11 to fit the conventional spindle or arbor mounting. The arbor (not shown) is provided with a transversely extending drive key that interlocks in a complementary slot 12 formed in the back of the body.

In the periphery of the cutter body there are formed a series of blade slots 13 which receive cutting blades 14. The front wall 15 of the slot locates the cutting edges of the blade, and assuming the front face of the blade is flat, as in the type herein illustrated, its plane must be so positioned with respect to the axis of the body, both radially and axially, as to place the outer corner cutting edges of the blade behind a diametral plane of the body.

Figure 3:
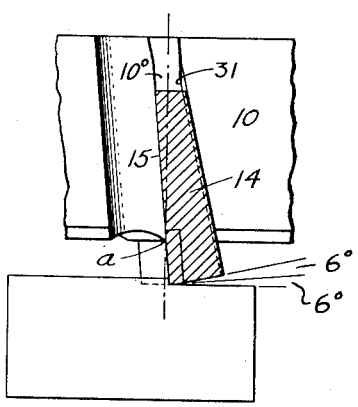
Figs. 3 and 4 are detail views of the relation of the cutting edges of a blade to the work.

With reference to Fig. 3, the forward end of the wall 15 starts on a diametral line or plane of the body at the point $a$ and proceeds axially rearwardly, to the left of the diametral plane, at an angle of 10°. In a radial direction, Fig. 4, the forward wall of the slot extends inwardly from the periphery of the body and makes an angle of 10° in this example with the diametral plane. In both instances, radially and axially, the forward wall 15 slants forward, away from the diametral plane of the body, in a direction that places the whole area thereof ahead of that plane with reference to the direction of cutter rotation.

Accordingly, when a blade is inserted in the slot and clamped against the forward compoundly inclined wall 15, the cutting edges of the blade, which extend beyond the peripheral and end surfaces of the body will be, at the outer corner at least, behind the diametral plane and ahead of the diametral plane at other portions, both longitudinally and radially.

The radial and helical angles above indicated for the slant of the forward wall of the blades are representative of the angles that may be used. Either or both may be decreased to 5° or increased to 15° depending upon the characteristics of the metal to be machined. With this method of machining, however, it is important that that portion of the front of the blade inward from the cutting edges, should slant forward (ahead of the cutting edge, in the direction of the cutting movement) an appreciable amount. If desired, the whole of the cutting edges may lie ahead of a diametral plane, but the preferred form is to arrange part of the cutting edge behind and the remainder ahead of the diametral plane for reasons hereinafter explained.

Figure 4:
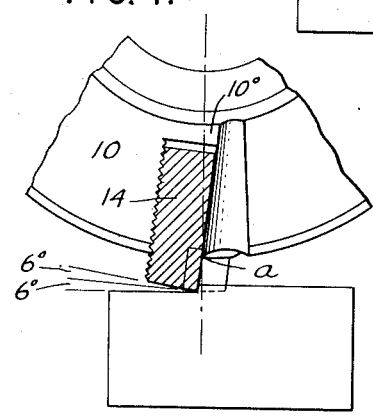

It will be seen that when the front face of the blade (or at least the chip engaging surface thereof) is forwardly inclined radially and axially, it overlays the work and the resultant of the tooling pressure on the work is downward, in Fig. 3, and radially outward, in Fig. 4. In neither case does the cutting edge underlie the layer of material to be removed and consequently there is no tendency to lift the workpiece or to lift by tearing the chip off the work. This action may be part of the explanation for the superior performance of this tool on milling steel.

However, with a cutter so constructed the forward sloping of the blade tends to push the workpiece away—both radially and axially, and likewise the chip flow is outward and the so-called build-up-edge that the industry is familiar with in hooked tools and cutters, is with this invention eliminated, or wiped off as quickly as it forms. The cutting edges of the forwardly leaning blade are, so to speak, self-cleaning, and the original ground sharpness of the cutting edge remains unimpaired. Moreover, a sharp and strong cutting edge is essential to this method of cutting steel because of the definite shear action of the cutting edge as it passes over the work. Actually, the angular relation between the front face of the blade and the work surface is less than 90°, and the layer of material caught in that pocket does not flow inwardly along the front of the blade, as in the case of hooked cutters, but instead tends to be compressed. This compression will, it will be seen, be greatest along the top layer of the work and reacts upon the blade surface some distance inward from its cutting edge. The cutting edge itself does not begin to compress the bottom layer of metal until the layers between the bottom layer and the top have first been compressed by more inwardly located and circumferentially more advanced portions of the blade. Hence, the shock delivered to the blade as it enters the work is first received at a point or line back from the cutting edge and travels into and is absorbed by much thicker and heavier portions of the blade long before the extreme outer or cutting edge enters the work.

The foregoing may be more readily perceived when regard is had for the fact that the extreme outer corner of the blade, of this invention, is trailing so-to-speak every other portion of the blade, and for that reason will strike the work last. And as the shock is first taken by an area inwardly located from the cutting edges, the cuttings edges themselves do not have to take that shock and even on steel, do not crumble.

In a milling cutter embodying the principle of a leaning forward blade, the cutting edges of the blades are additionally reinforced and strengthened due to the wider angle of the cutting edge. If the outer end and peripheral edges of the blade were to lie in a plane 90° away from the plane of the front face, the leaning forward of the blade 5 to 10 degrees, will of itself provide 5 to 10 degrees clearance angle between those edge surfaces and the work.

When machining flat surfaces as represented by Figs. 3 and 4, that amount of clearance is ample, assuming that the blade is not unduly thick from front to back and that the radius of the cutter is not too small in proportion. In that event it is necessary to back off from the cutting edge only a slight additional amount to provide proper land and form. In some instances, the end surface of the blades may be even more than 90° away from the plane of the front face whereby the angle of the cutting edge may exceed 90° and become obtuse.

As compared with the conventional hooked type of cutter, wherein the general plane of the blade slants to the rear of the diametral plane the clearance angle with relation to the work may be the same but there is considerably less blade stock left to back up the cutting edge.

The forward slanting blade, in addition to the features above mentioned, provides considerably increased strength to the cutting edge, by virtue of the widening of the angle between the edge and front surfaces. This increase may in some instances be as much as 20° or more. For example, with a hook type of blade, one may have a 6 degree back off to provide a land, and a 6 degree further back off for clearance, and if the hook blade slants to the rear 10 degrees, the angular amount of blade stock behind the cutting edge is only 68 degrees, which is somewhat sharp. With the present invention, where the blade slants forward (ahead of the axis) 10 degrees, the angle between the front face and the work becomes 100 degrees (through the body of the blade) and the same 12° clearance at the end edge reduces this to 88° or almost to a right angle. Thus, the net increase in blade stock backing up the cutting edge of a tool of this invention is on the order of 30% greater than is possible in the standard design of hook in cutters.

This again is an important factor in making it possible to use carbides of tungsten on the blade tips and to machine steel therewith, for not only is the carbide tip backed up with greater mass of material, but that the line of the reactionary forces of the cutting passes within the boundaries of the wide angle blade.

Figure 5:
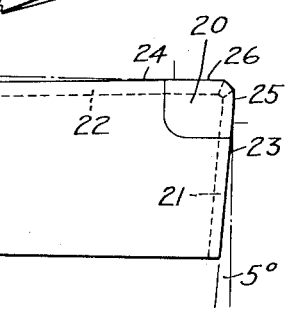
Fig. 5 is a face view of a blade illustrating the approximate area tipped and the relief angles with respect to the cutting edges of that area.
Figure 6:
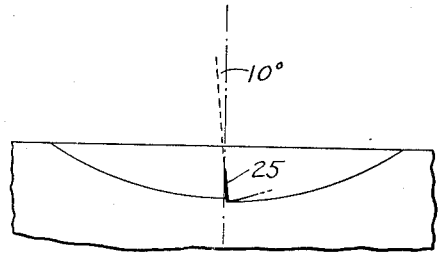
Fig. 6 is a diagram of the angular relation of the cutting edge to the direction of rotation in a facing operation.

Fig. 5 of the drawing is a face view of a blade in which there is cemented a section of tungsten carbide 20. From front to back the end and peripheral sides 21 and 22 are backed off, as represented by the dotted lines, to provide clearance space. A blade of this character is not intended to cut along its entire peripheral edge 24 or end edges 23, but only along the edges of the carbide block 20. And, therefore, to prevent the possibility of the uncarbided edges dragging, each edge is given a relief, 1–2 degrees on the periphery and 5 degrees on the end, running away from points within the carbided tip. By so relieving the blade, the cutting action is confined to the tipped portion, and there is less chance of chip drag.

As the whole blade slants forward in the cutter body both radially and helically, the cutting edge 25 remains perpendicular to the axis of rotation while the edge 26 extends helically, and in plan is not straight but curved.

Every point along the peripheral edge 26 is the same distance from the axis of rotation, but due to the advancing helix, the portion most removed from the outer end engages the workpiece first. Thereafter, the work load gradually moves along the edge to the outer end.

As this curved edge 26 becomes engaged in the work, the cutting begins at or along the edge of the workpiece nearest the body of the cutter and progresses laterally across. If there were no relative feed movement between the work and the tool, any given blade would cut a curved channel parallel to the cutter axis across the work at the diameter of the cutter. However, as there will be a relative feed movement in milling operations, the effect of the feed is such that each blade cuts a channel diagonally across the work. The angle that the channel makes with respect to the cutter axis depends, of course, on the relative rates of feed and cutter rotation, but in every case the angle is opposite that of the helix angle of the blade at the zone of engagement.

The combination of the feed movement with the advancing helix angle of the blade, positions the cutting zone of the blade at an angle of more than 10 degrees (in this example) to the cut and the chip is shorn from the work with a part draw action. The chip starts its curl at the edge of the work nearest the body and progresses laterally across the inclined face of the blade (reaching the outer and trailing end last) and at the same time diagonally across the work.

The clamping or fixation of the carbide tipped blades in the body 10, may be effected by wedges, clamp screws, etc., that will securely lock the blades in place or the cutting edges and body may be integral. The simple tapered form of replaceable blade serves the purpose admirably well for it eliminates the need for costly body stock and for auxiliary clamping devices and with a multi-slotted cutter, the blades are mutually supporting. As illustrated in Figs. 1 and 3, each blade is tapered longitudinally, and fits a complementary tapered slot in the body. The back surface of the blades are serrated, as at 30, in the direction of the taper and similar serrations are formed in the back wall of the slots 31. In this example the blades are inserted from the face end of the cutter and progressively tapped home until all are securely clamped.

Notwithstanding that the amount of body stock between blade openings diminishes toward the cutter axis, and the driving in of any one blade would tend to flex the body portions circumferentially, the presence of blades in adjacent slots effectively prevents body flexing. Progressively tapping the blades home results in a more uniform distribution of the clamping pressures around the whole cutter and the result in the aggregate equals that of a solid cutter.

The serrated back faces of the blades and walls of the slot form positive means for locking the blades against transverse movement in the slots and also a means for stepping the blades outwardly to compensate for wear. And while the taper and serrations are illustrated herein as extending generally longitudinally of the cutter body, they may alternatively, extend radially, with equally efficient clamping and adjustment effect.

It will also be evident from the foregoing that the principle herein set forth of leaning the blade forward over the chip is applicable to slotting cutters wherein the cutting edges are at both sides of the cutter body—alternate blades at alternate angles, and to styles of cutters that cut only on their peripheries or on their end faces. In all such cases, however, the chip engaging face of the blade must lean forward over the workpiece and be given a helix opposite to the hand of the cutter, i. e., right hand cutters will have cutting edges set to a left hand helix, and left hand cutters will have cutting edges set to a right hand helix. Cutting edges so positioned will first engage the work some distance inwardly from the extreme end and periphery and receive the main blow or shock of the engagement at a mid section of the blade remote from the point. This seems to be all important in the successful milling of steel with carbide tipped cutters.

Tests with a cutter so constructed have resulted in producing a polished finish on molybdenum steel (#4340) that renders subsequent grinding a superfluous operation except in the very few and rare cases where a super degree of excellence is required.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be and are intended to be, comprehended within the meaning and range of equivalency of the following claims.

Having thus revealed this invention, I claim as new and desire to secure the following combinations and elements, or equivalents thereof, by Letters Patent of the United States:

1. A rotatable face milling cutter comprising a body member having a plurality of cutting edges about its periphery, each of said peripheral cutting edges extending generally longitudinally of the axis of rotation of the cutter and at helical angle relative to said axis which progresses from the face end of said cutter partially about the cutter body in a direction opposite to the hand of the milling cutter.

2. A rotary face milling cutter comprising a body member having a plurality of cutting edges spaced about its periphery, each of said cutting edges extending generally longitudinally of the cutter but at a helix angle that progresses rearwardly in the same direction as the direction of normal rotation of the cutter whereby each cutting edge first engages the workpiece at a region located a distance from the outer peripheral end.

3. A rotary cutter comprising a body member equipped with a plurality of cutting edges projecting from one end face thereof, each of said cutting edges lying in a tangential plane that intersects a diametral plane of the cutter body well in advance of the cutter axis, whereby each point along each of said cutting edges inward from the periphery is circumferentially ahead of the point at the periphery.

4. A face milling cutter for machining a mirror-like surface on a steel workpiece with the removal of a layer of stock from the surface thereof comprising a body member having a plurality of substantially rectangular blades therein, each of said blades having a rectangular carbide insert in the front face positioned therein in a plane lying at an angle relative to the longitudinal axis of the cutter and also at an angle relative to a plane radial of the cutter such that with respect to the direction of rotation of the cutter the chip engaging front face of the carbide insert leans forward and overlies the chip in both directions radially and axially and thereby positioning the tipped cutting edges at the extreme outer corner of the blade circumferentially behind other portions of the cutting edges inwardly removed therefrom, said leaning forward relation of the front face of the rectangular insert automatically lifting the rear face of the rectangular insert relative to the surface operated upon to provide clearance space at the end and peripheral edges thereof without appreciable grinding of the said edges of the insert.

5. A face milling cutter comprising a body member adapted to be rotatably driven, said body member having a plurality of helically arranged blade receiving slots spaced about its periphery, a blade member secured in each of said slots and projecting from the end and periphery of the body to provide intersecting face and peripheral cutting edges, said slots being formed in said body with a lead angle such that the peripheral cutting edge of each inserted blade progresses forward relative to the direction of rotation of the cutter thereby positioning the zone of intersection of said cutting edges circumferentially behind other portions along the peripheral cutting edge and the chip engaging face of the blade with respect to face milling operations at an angle of less than 90° to the plane of the surface of the workpiece.

6. A rotary face milling cutter comprising a body member, a plurality of cutting elements about its periphery, each having end and peripheral cutting edges and each element being compoundly slanted relative to axial and radial planes of the body so that the chip engaging face thereof leans forward over the chip both radially and axially and exerts a pressure against the work in a radially and axially outward direction.

7. A rotary face milling cutter comprising a body member having a plurality of carbide tipped cutting blades provided with intersecting end and peripheral cutting edges spaced about its periphery, each of said cutting blades extending spirally axially of the body and in a direction transverse a radial plane thereof so that with respect to the direction of rotation of the cutter, cutting zones along said cutting edges progressing inwardly from the said point of intersection are circumferentially ahead of said point of intersection and whereby said tipped point engages the workpiece last.

8. A rotary face milling cutter comprising a body member having a cutting edge projecting from its periphery, said cutting edge extending rearwardly from the end face of the cutter in a direction transverse the axis of rotation and to a point ahead of the axis in relation to the direction of rotation whereby said cutting edge first engages the workpiece at a distance from its outer peripheral end.

9. A rotatable milling cutter combining a body member adapted to be driven, said body member having a plurality of blade receiving slots spaced about its periphery, a substantially rectangular blade member secured in each of said slots and projecting from the end and periphery of the body to provide intersecting face and peripheral cutting edges, said slots being formed in said body at a compound angle such that the planes of the blades and the cutting edges thereon slant forward relative to the direction of rotation of the cutter so that the faces of the respective blades lean over the chip, said forward leaning automatically lifting the peripheral and end edges of the rectangular blades away from the work surface to provide clearance behind the cutting edges and substantial back support therefor without appreciable grinding.

10. A cutting tool combining a body member adapted to be rotated about an axis, said body member having a cutting element projecting outwardly therefrom both in an axial direction and in a radial direction, end and peripheral cutting edges on said element, the said end edge extending generally radially of the member but at an angle to the radial plane such that the extreme outer portion of said end edge is circumferentially behind more inwardly located portions, and the said peripheral cutting edge extending in the general direction of the axis of rotation of said body member but at an angle thereto in the nature of a helix which progresses around the body member in the same direction as the direction of rotation of said body member whereby the portion of said peripheral edge nearest said end edge is circumferentially behind other portions of said peripheral edge.

ERNEST REANEY.